US010845134B2

(12) United States Patent
Magee et al.

(10) Patent No.: US 10,845,134 B2
(45) Date of Patent: Nov. 24, 2020

(54) HINGED BAFFLE ASSEMBLY FOR HEAT RECOVERY STEAM GENERATOR

(71) Applicant: General Electric Company, Schenectady, NY (US)

(72) Inventors: Jeffrey Frederick Magee, Longmeadow, MA (US); Van Dang, Bloomfield, CT (US); Alessandro Matarrese, Simsbury, CT (US); Remo Richard Noonan, Wallingford, CT (US)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 15/921,736

(22) Filed: Mar. 15, 2018

(65) Prior Publication Data

US 2019/0285366 A1   Sep. 19, 2019

(51) Int. Cl.
| F28F 9/02 | (2006.01) |
| F16B 17/00 | (2006.01) |
| F22B 29/06 | (2006.01) |
| F28F 9/04 | (2006.01) |
| F28F 9/013 | (2006.01) |
| F22B 37/40 | (2006.01) |
| F22B 37/00 | (2006.01) |
| F28F 9/22 | (2006.01) |

(52) U.S. Cl.
CPC ............ *F28F 9/0256* (2013.01); *F16B 17/00* (2013.01); *F22B 29/06* (2013.01); *F22B 37/40* (2013.01); *F28F 9/0131* (2013.01); *F28F 9/04* (2013.01); *F22B 37/001* (2013.01); *F28F 2009/222* (2013.01); *F28F 2280/105* (2013.01)

(58) Field of Classification Search
CPC ........ F01K 23/10; F16B 17/00; F22B 1/1815; F22B 21/002; F22B 21/24; F22B 29/06; F22B 37/001; F22B 37/02; F22B 37/205; F22B 37/40; F28D 1/0477; F28D 7/085; F28D 21/001; F28F 9/0131; F28F 9/0256; F28F 9/04; F28F 27/02; F28F 2009/222; F28F 2280/105
USPC .............. 122/235.17, 367.1, 411, 406.2, 503
See application file for complete search history.

(56) References Cited

U.S. PATENT DOCUMENTS

| 3,805,884 A * | 4/1974 | Burt ...................... F16K 11/052 137/875 |
| 4,427,058 A | 1/1984 | Bell, Sr. et al. |
| (Continued) | | |

*Primary Examiner* — Steven B McCallister
*Assistant Examiner* — Benjamin W Johnson
(74) *Attorney, Agent, or Firm* — Charlotte Wilson; Hoffman Warnick LLC

(57) ABSTRACT

Hinged baffle assemblies for heat recovery steam generators (HRSGs) are disclosed. The baffle assemblies may include a baffle plate for directing exhaust fluid through a casing of the HRSG. The baffle plate may include first and second ends, a first surface exposed to the exhaust fluid flowing through the casing, and a second surface opposite the first surface. The baffle assemblies may also include a hinge component coupled to the first end of the baffle plate and positioned within/fixed relative to the casing. Additionally, the baffle assemblies may include a first diverter plate positioned adjacent to the second end of the baffle plate. The first diverter plate may directly contact the first surface of the baffle plate and may aid in directing the exhaust fluid through the casing of the HRSG.

20 Claims, 12 Drawing Sheets

(56) References Cited

U.S. PATENT DOCUMENTS

| | | | | |
|---|---|---|---|---|
| 4,919,169 A | * | 4/1990 | Bachmann | F16K 11/052 137/875 |
| 5,299,601 A | * | 4/1994 | Koch | F16K 31/521 137/875 |
| 6,919,050 B2 | * | 7/2005 | Hettwer | F22B 1/1815 422/168 |
| 7,555,890 B2 | * | 7/2009 | Kurihara | F02C 9/16 60/39.182 |
| 9,810,487 B2 | * | 11/2017 | Watson | F28F 9/0268 |
| 2013/0192810 A1 | | 8/2013 | Lech et al. | |

\* cited by examiner

HINGED BAFFLE ASSEMBLY FOR HEAT RECOVERY STEAM GENERATOR

BACKGROUND OF THE INVENTION

The disclosure relates generally to a combined cycle power plant system, and more particularly, to a hinged baffle assembly for a heat recovery steam generator (HRSG) of the combined cycle power plant system.

Power systems typically include a variety of different turbomachines and/or systems that are used to generate operational load and/or power output. Two conventional power systems used to generate operational loads include gas turbine systems and combined cycle power plants, which typically include a gas turbine system(s) and a steam turbine system(s). Conventional combined cycle power plants employ one or multiple gas turbine system(s) operatively coupled to one or multiple steam turbine system(s). The gas turbine system includes a compressor and a combustor coupled to a gas turbine. The gas turbine is usually coupled to and drives an external component, such as a generator, for producing a load or power output. The steam turbine system may include a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator). In a typical combined cycle power plant, exhaust gas from the gas turbine is passed to a heat recovery steam generator (HRSG), which may be used to reheat and provide steam to the various turbines of the steam turbine system for enhanced efficiency of the system and/or power plant. Downstream of the HRSG, the exhaust gas is released to the atmosphere through a stack.

To improve efficiency within some of the portions of the combined cycle power plant, baffle systems or assemblies may be utilized to direct the working fluids of the combined cycle power plant through the various portions. For example, the HRSG may include a baffle system to direct or redirect exhaust gas (e.g., working fluid) through the HRSG to interact and/or flow over components of the HRSG responsible for generating and/or heating steam. Conventional baffle systems for the HRSG may include a plurality of elongated sheets that may be inserted, slid, and/or secured by a track system positioned on each end of the sheet. For example, each of the elongated sheets forming the conventional baffle system for the HRSG may mate with and/or slidably engage a corresponding track system included within the HRSG. The track system allows the elongated sheets to move along the track system until each elongated sheet is positioned in a desired location for directing the exhaust gas within the HRSG.

Each of the elongated sheets of the conventional baffle system are only held in place by the track system, the position of elongated sheets may shift over time, creating gaps between the sheets. Additionally, or alternatively, gaps may be formed between the sheets due to improper installation of the baffle system within the HRSG. Specifically, because of the position of the baffle system within the HRSG and/or the limited space within the HRSG surrounding the baffle system, installation is often difficult, as well as time consuming, and often results in improper installation (e.g., gap formation) of the sheets within the HRSG. The gaps between the sheets of the convention baffle system may result in a leakage of exhaust gas from the HRSG or a desired flow path of the exhaust gas within the HRSG. Leakage of the exhaust gas from the HRSG and/or the desired flow path in turn reduces the efficiency and/or operational performance of the HRSG, and ultimately the overall efficiency and/or operational performance of the combined cycle power plant.

BRIEF DESCRIPTION OF THE INVENTION

A first aspect of the disclosure provides a baffle assembly for a heat recover steam generator (HRSG). The baffle assembly includes: a baffle plate directing an exhaust fluid through a casing of the HRSG, the baffle plate including: a first end; a second end positioned opposite the first end; a first surface extending between first end and second end, the first surface exposed to the exhaust fluid flowing through the casing of the HRSG; and a second surface extending between first end and second end, the second surface positioned opposite the first surface; a hinge component coupled to the first end of the baffle plate to adjust a rotational position of the baffle plate within the HRSG, the hinge component positioned within and fixed relative to the casing of the HRSG; and a first diverter plate positioned adjacent to the second end of the baffle plate, the first diverter plate directly contacting the first surface of the baffle plate and directing the exhaust fluid through the casing of the HRSG.

A second aspect of the disclosure provides a heat recover steam generator (HRSG) including: a casing for receiving an exhaust fluid; at least one fluid tube positioned within the casing; and a baffle assembly positioned within the casing, adjacent the at least one fluid tube, the baffle assembly including: a baffle plate directing the exhaust fluid through the casing, the baffle plate including: a first end; a second end positioned opposite the first end; a first surface extending between first end and second end, the first surface exposed to the exhaust fluid flowing through the casing; and a second surface extending between first end and second end, the second surface positioned opposite the first surface; a hinge component coupled to the first end of the baffle plate to adjust a rotational position of the baffle plate within the casing, the hinge component positioned within and fixed relative to the casing; and a first diverter plate positioned adjacent to the second end of the baffle plate, the first diverter plate directly contacting the first surface of the baffle plate and directing the exhaust fluid to the at least one fluid tube positioned within the casing.

A third aspect of the disclosure provides a baffle assembly for a heat recover steam generator (HRSG). The baffle assembly includes: a first baffle plate directing an exhaust fluid through a casing of the HRSG, the first baffle plate including a first end and a second end; a first hinge component coupled to the first end of the first baffle plate to adjust a rotational position of the first baffle plate within the casing of the HRSG, the first hinge component positioned within and fixed relative to the casing of the HRSG; a first extension plate positioned adjacent the second end of the first baffle plate, the first extension plate receiving and contacting the second end of the first baffle plate; a first diverter plate positioned adjacent to the second end of the first baffle plate, the first diverter plate directly contacting the first baffle plate and directing the exhaust fluid through the casing of the HRSG; a second baffle plate directing the exhaust fluid through a casing of the HRSG, the second baffle plate including a first end and second end, the first end of the second baffle plate positioned adjacent the second end of the first baffle plate, and a second end; a second hinge component coupled to the first end of the second baffle plate to adjust a rotational position of the second baffle plate within the casing of the HRSG, the second hinge component positioned on the first extension plate; a second extension plate positioned adjacent the second end of the second baffle plate, the second extension plate receiving and contacting the second end of the second baffle plate; and a second diverter plate positioned adjacent to the second end of the second baffle plate, the second diverter plate directly contacting the second baffle plate and directing the exhaust fluid through the casing of the HRSG.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
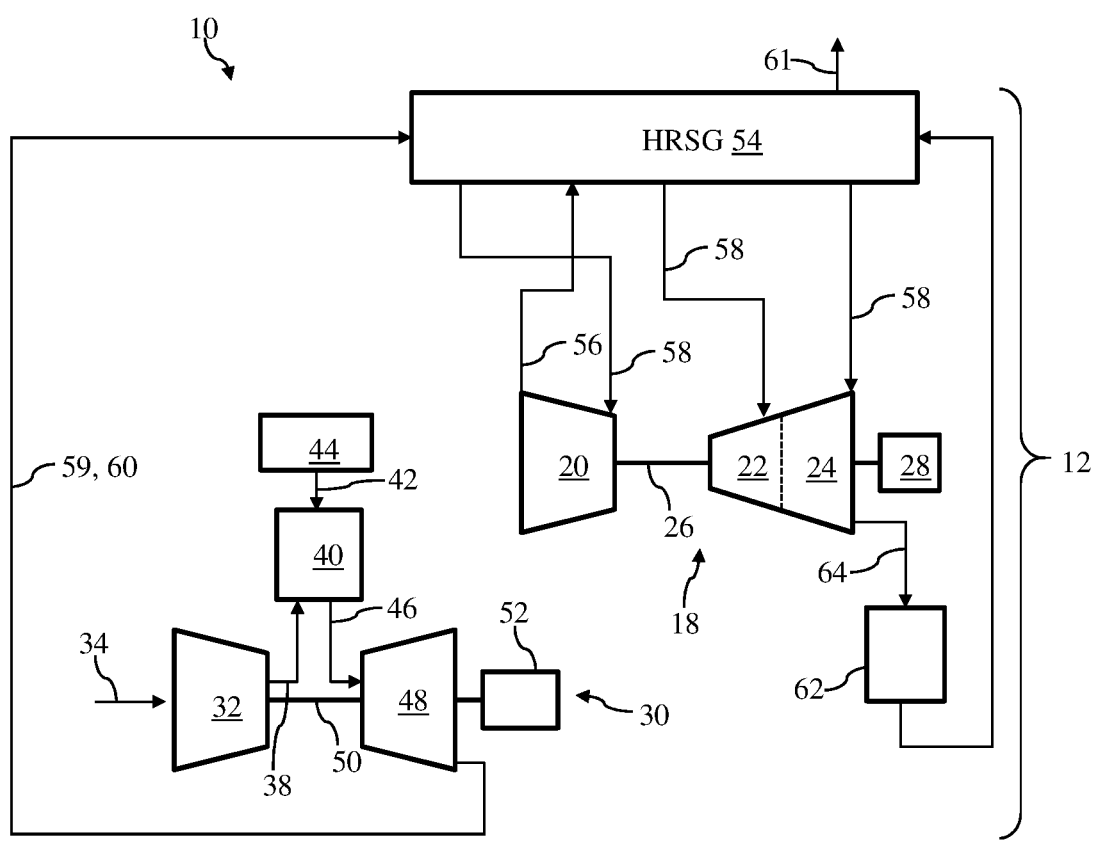
FIG. 1 shows a schematic view of a combined cycle power plant system including a gas turbine system, a steam turbine system and a control system, according to embodiments of the disclosure.

As an initial matter, in order to clearly describe the current disclosure it will become necessary to select certain terminology when referring to and describing relevant machine components within a combined cycle power plant system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air/fluid through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

As indicated above, the disclosure relates generally to combined cycle power plant system, and more particularly, to a hinged baffle assembly for a heat recovery steam generator (HRSG) of the combined cycle power plant system.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 shows a schematic depiction of a system 10 according to various embodiments of the disclosure. As shown, system 10 can include a combined cycle power plant system 12 (hereafter, "power plant system 12") including a steam turbine (ST) system 18, which in the depiction shown, can include a high pressure (HP) portion 20, an intermediate pressure (IP) portion 22 and a low pressure (LP) portion 24, as is known in the art. HP portion 20, IP portion 22 and LP portion 24 of ST system 18 may all be coupled and/or positioned on and/or may be configured to rotate a shaft 26 to produce mechanical work and/or to drive an additional component of ST system 18. As shown in FIG. 1, shaft 26 of ST system 18 may be coupled to and/or may drive an external component, such as a generator 28 configured to generate power and/or produce a load.

Power plant system 12 can further include a gas turbine (GT) system 30. GT system 30 may include a compressor 32. Compressor 32 compresses an incoming flow of fluid 34 (e.g., air) as it flows through compressor 32. GT system 30 may also include a plurality of stages of stator vanes (not shown) and rotating blades (not shown) positioned within compressor 32. The stator vanes and rotating blades positioned within compressor 32 may be configured to aid in moving and/or passing fluid 34 through compressor 32. Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. The flow of combustion gas 46 is in turn delivered to a turbine component 48, which typically includes a plurality of stages of stator vanes (not shown) and turbine blades (not shown), similar to compressor 32. The flow of combustion gas 46 drives turbine component 48 to produce mechanical work. The mechanical work produced in turbine component 48 drives compressor 32 via a shaft 50, and may be used to drive an external component such as a generator 52 to generate power and/or produce a load.

Although power plant system 12 is shown in FIG. 1 to include a dual-shaft configuration where two separate generators 28, 52 are utilized, it is understood that in other non-limiting examples, ST system 18 and GT system 30 may share a single shaft and in turn, may share a single generator. Additionally, although power plant system 12 is shown to only include a single ST system 18 and single GT system 30, it is understood that power plant system 12 may include a plurality of ST systems 18 and/or GT system(s) 30 that may be configured to generate an operational load and/or power output.

Power plant system 12 can further include a heat recovery steam generator (HRSG) 54 fluidly connected with ST system 18 (e.g., with HP portion 20, IP portion 22 and/or LP portion 24) and GT system 30. As shown in the non-limiting example of FIG. 1, HRSG 54 may be fluidly connected and/or coupled with ST system 18 via exhaust conduit(s) 56 to receive exhaust fluid (e.g., steam) from ST system 18, as well as, provide steam to the portions of ST system 18 via supply conduits 58. Additionally in the non-limiting example of FIG. 1, HRSG 54 may be fluidly connected and/or coupled with GT system 30 via an exhaust channel 59 coupled to and/or in fluid communication with turbine component 48. Exhaust channel 59 may provide exhaust fluid 60 (e.g., exhaust gas) from GT system 30 to HRSG 54 to be utilized in generating and/or heating steam for ST system 18. A stack 61 of HRSG 54 may exhaust or release (excess or used) gas (e.g., exhaust fluid 60) and/or fluid from HRSG 54 into the atmosphere and/or out of power plant system 12, e.g., via environment controls (not shown).

Power plant system 12 can further include a condenser 62. Condenser 62 may be in fluid communication and/or may be fluidly coupled with various components of power plant system 12. In a non-limiting example, condenser 62 may be fluidly connected and/or coupled to LP portion 24 of ST system 18 via steam exhaust duct 64. Condenser 62 may be configured to condense exhaust flow and/or bypass flow (not shown) from ST system 18 and/or HRSG 54, and providing condensed fluid (e.g., condensate water) to HRSG 54, as is known in the art.

Figure 2:
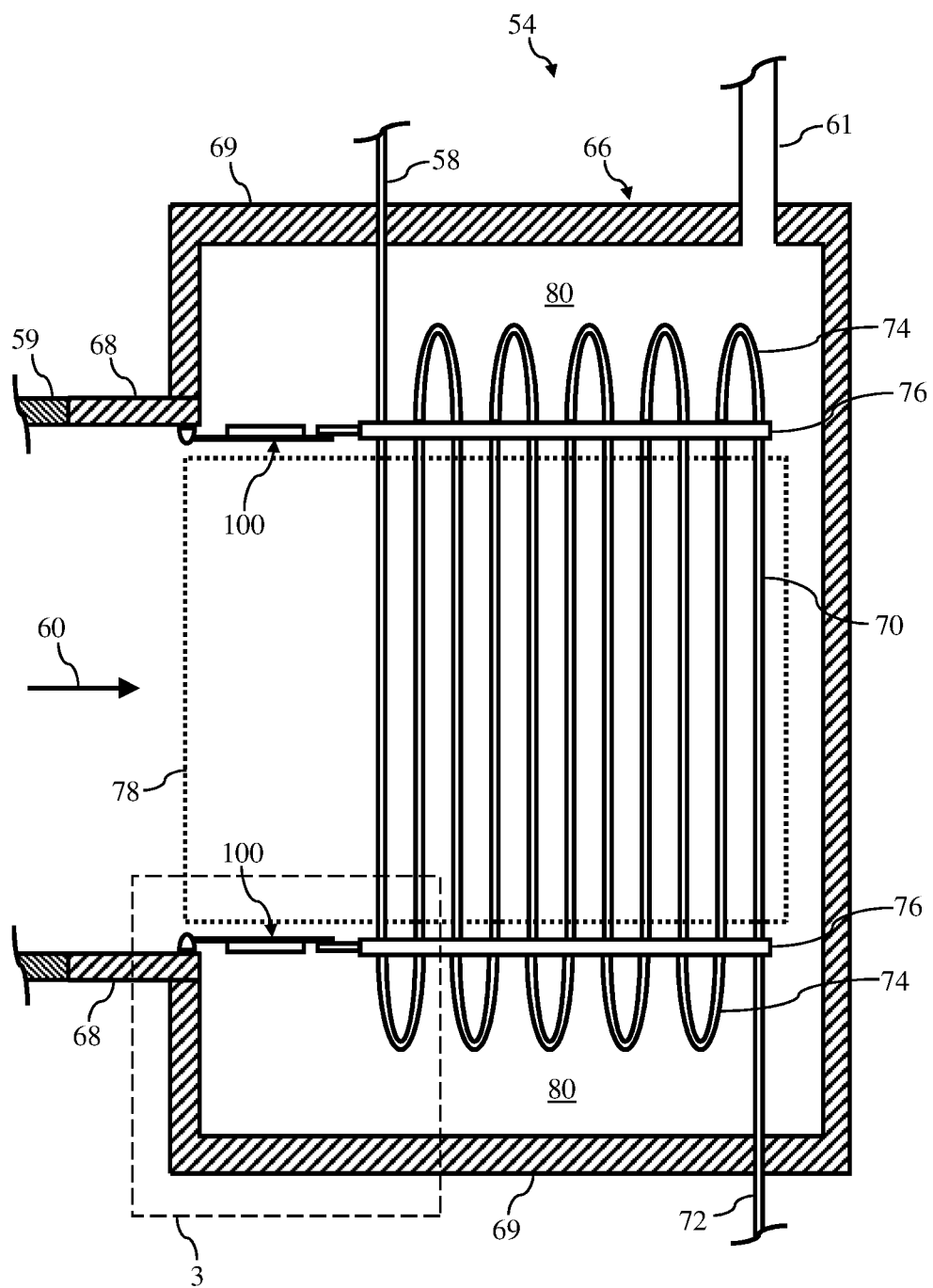
FIG. 2 shows a side cross-sectional view of a heat recovery steam generator (HRSG) of the combined cycle power plant system of FIG. 1 and a plurality of hinged baffle assemblies positioned within the HRSG, according to embodiments of the disclosure.

FIG. 2 shows a side cross-sectional view of HRSG 54 of power plant system 12 of FIG. 1. As shown in FIG. 2, and as discussed herein with respect to FIG. 1, exhaust channel 59 may provide exhaust fluid 60 (e.g., exhaust gas) from GT system 30 (see, FIG. 1) to HRSG 54. Exhaust channel 59 may be coupled to and in fluid communication with a casing 66 of HRSG 54 to provide exhaust fluid 60 to HRSG 54. Specifically, exhaust channel 59 may be coupled to a removable panel 68 of casing 66 for HRSG 54 to fluidly couple exhaust channel 59 and casing 66, and to provide exhaust fluid 60 to an internal chamber, cavity, or space of casing 66 of HRSG 54. Removable panel 68 may be a distinct component or part from remaining portion 69 that may be removed and/or (releasably) coupled to remaining portion 69 to form casing 66. That is, removable panel 68 may be coupled and/or affixed to remaining portion 69 to form casing 66 during an installation process, as discussed herein. Exhaust fluid 60 may flow through cavity 66 of HRSG 54, and/or over a plurality of components of HRSG 54 configured to generate and/or heat fluid (e.g., water and/or steam) into steam that may be provided to ST system 18 via supply conduits 58. Once exhaust fluid 60 passes through casing 66 of HRSG 54, exhaust fluid 60 may exhaust or release from HRSG 54 into an environmental control (not shown), the atmosphere and/or out of power plant system 12 via stack 61 of HRSG 54.

As shown in FIG. 2, HRSG 54 may include at least one fluid conduit or tube 70 (hereafter, "fluid tube(s) 70") positioned within casing 66. Specifically, HRSG 54 may include fluid tube(s) 70 extending through and/or positioned within casing 66 of HRSG 54. Fluid tube(s) 70 of HRSG 54 may include and/or be a part of any suitable component, assembly, and/or system that may utilize the heat of exhaust fluid 60 to generate and/or heat fluid into steam for ST system 18. For example, fluid tube(s) 70 may be tubes or conduits for superheater module(s) of HRSG 54, which may carry and/or move generated steam through casing 66 of HRSG 54 to be exposed to exhaust fluid 60, and ultimately heat the generated steam carried therein. In other examples, fluid tube(s) 70 may be tubes or conduits for a steam generator module for a once through (OT) HRSG 54. Fluid tube(s) 70 may carry and/or move feed water supplied by feed water conduit 72 through casing 66 of HRSG 54 to be exposed to exhaust fluid 60, and ultimately convert the feed water to steam to be used by ST system 18, as discussed herein.

Fluid tube(s) 70 of HRSG 54 may include a single tube that is formed with a serpentine pattern, or alternatively includes a plurality of distinct fluid tubes 70 in fluid communication with one another. As shown in FIG. 2, fluid tube(s) 70 may include and/or may be in fluid communication via turn portions 74 positioned within casing 66. Additionally, fluid tube(s) 70 and turn portions 74 may be coupled to and/or positioned through tube sheets 76. Tube sheets 76 may be positioned within casing 66 to substantially support and/or secure fluid tube(s) 70 and turn portions 74 within casing 66 during operation of HRSG 54. The use of turn portions 74 in fluid tube(s) 70 may move fluid (e.g., feed water and/or generated steam) through casing 66 of HRSG 54 multiple times (e.g., serpentine pattern) to increase the exposure of fluid tube(s) 70, and the feed water and/or steam flowing therein, to exhaust fluid 60 flowing through casing 66 of HRSG 54.

Additionally as shown in FIG. 2, HRSG 54 may also include at least one hinged baffle assembly 100 (hereafter, "baffle assembly 100"). Baffle assembly 100 may be positioned within casing 66 of HRSG 54. Additionally, baffle assembly 100 may be positioned adjacent to and/or substantially upstream of fluid tube(s) 70 of HRSG 54. Baffle assembly 100 may be positioned within casing 66 to direct the flow of exhaust fluid 60 through casing 66 of HRSG 54. That is, baffle assembly 100 positioned within casing 66 may at least partially define a desired flow path 78 (shown in phantom) for exhaust fluid 60 flowing through HRSG 54, and may be utilized to direct exhaust fluid 66 through casing 66 of HRSG 54 along and/or within desired flow path 78. In a non-limiting example, desired flow path 78 may be defined by, and/or may include outer boundaries based on baffle assembly 100, as well as tube sheet 76 positioned within casing 66 of HRSG 54. Desired flow path 78 for exhaust fluid 60 may be substantially aligned with and/or include the majority of fluid tube(s) 70 positioned between tube sheets 76. As such, baffle assembly 100 may be configured to direct exhaust fluid 60 through casing 66, and more specifically, along desired flow path 78 through casing 66 toward and/or to contact or flow over fluid tube(s) 70 positioned within HRSG 54 during operation of power plant system 12 (see, FIG. 1). Directing exhaust fluid 60 through desired flow path 78 may substantially improve the operational efficiencies of HRSG 54 (i.e., heat transfer from exhaust fluid 60 to fluid tube(s) 70, and the fluid therein).

Additionally, by directing exhaust fluid 60 through desired flow path 78, baffle assembly 100 may minimize or prevent leakage of exhaust fluid 60 from desired flow path 78, and/or into portions of casing 66 of HRSG 54 that do not require exposure to exhaust fluid 60. For example, baffle assembly 100 may minimize or prevent leakage of exhaust fluid 60 from desired flow path 78 to a space 80 of casing 66. Space 80 may be a distinct space or area of casing 66 from the space or area including desired flow path 78 of exhaust fluid 60 flowing through casing 66. Space 80 may be substantially separated from desired flow path 78 of exhaust fluid 60 by baffle assembly 100 and tube sheets 76 of HRSG 54. In non-limiting examples, space 80 may contain turn portions 74, condensation drain conduits (not shown) in fluid communication with at least one turn portion 74, additive supply conduits (not shown) in fluid communication with at least one turn portion 74, and/or other components utilized by fluid tube(s) 70, each of which do not require exposure to exhaust fluid 60. Although shown as substantially open, void of components, and/or not filled, it is understood that space 80 of casing 66 may include a plurality of components included within and/or utilized by HRSG 54, as discussed herein.

In the non-limiting example, two baffle assemblies 100 are shown. However, it is understood that more or less baffle assemblies 100 may be utilized within casing 66 to direct exhaust fluid 60 through casing 66 and/or at least partially define desired flow path 78 for exhaust fluid 60 through casing 66. That is, casing 66 may include a plurality of baffle assemblies 100 that may be positioned on all internal surfaces or walls, and/or circumferentially around the internal area of casing 66 to direct exhaust fluid 60 through casing 66 and/or at least partially define desired flow path 78 for exhaust fluid 60 through casing 66. For example, casing 66 may be configured as a substantially four-sided vessel. The internal bottom portion or wall, the internal top/roof portion or wall, and both internal side portions or walls of casing 66 may all include baffle assemblies 100. In this example, and similar to the non-limiting example shown in FIG. 2, baffle assemblies 100 positioned on the internal bottom portion or wall of casing 66 may at least partially define a bottom boundary of the desired flow path 78 for exhaust fluid 60 moving through casing 66 (see, FIG. 2), and baffle assemblies 100 positioned on the internal top/roof portion or wall of casing 66 may at least partially define a top/upper boundary of desired flow path 78 for exhaust fluid 60 moving through casing 66 (see, FIG. 2). Additionally, baffle assemblies 100 positioned on each of the side portions or walls of casing 66 may at least partially define a side boundaries of the desired flow path for exhaust fluid 60 moving through casing 66 (not shown in FIG. 2 for clarity).

Figure 3:
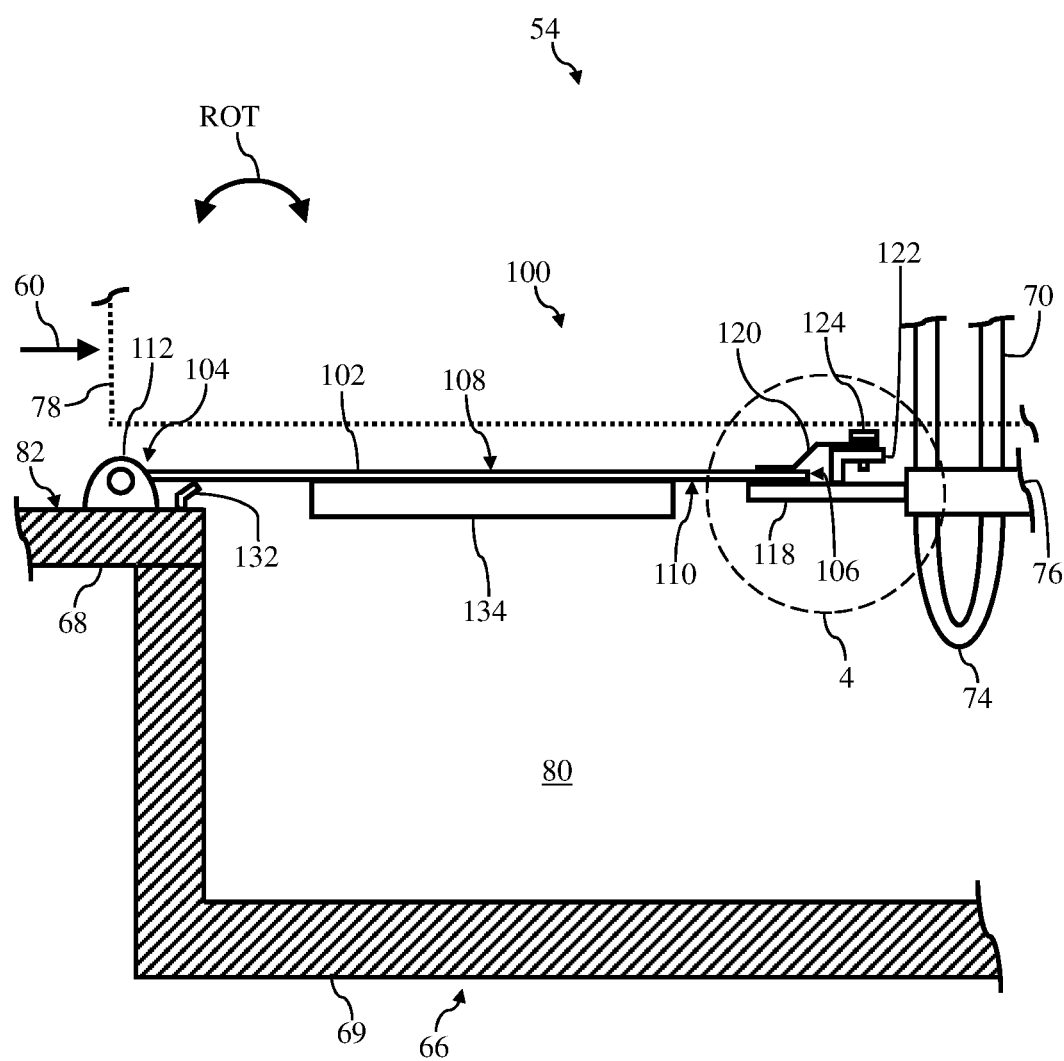
FIG. 3 shows a side cross-sectional view of a portion of the HRSG and the hinged baffle assembly of FIG. 2, according to embodiments of the disclosure.

FIG. 3 shows a side cross-sectional view of a portion of casing 66 of HRSG 54 and baffle assembly 100 shown in FIG. 2. Specifically, FIG. 3 shows a side cross-sectional view of a bottom portion of casing 66 of HRSG 54, fluid tube(s) 70, tube sheet 76, and a single baffle assembly 100 shown in FIG. 2. Baffle assembly 100 configured to direct exhaust fluid 60 through casing 66, and define at least a portion of desired flow path 78 for exhaust fluid 60 through casing 66 is discussed in further detail herein. It is understood that similarly numbered and/or named components may function in a substantially similar fashion. Redundant explanation of these components has been omitted for clarity.

As shown in FIG. 3, baffle assembly 100 may include a baffle plate 102. Baffle plate 102 may be positioned within casing 66 of HRSG 54 and may direct exhaust fluid 60 through casing 66 of HRSG 54 during operation of HRSG 54. Additionally, baffle plate 102 may at least partially define desired flow path 78 for exhaust fluid 60 moving through HRSG 54, as discussed herein. Baffle plate 102 of baffle assembly 100 may be formed as a solid, unibody component. Additionally, baffle plate 102 may be formed from any substantially rigid material that may prevent exhaust fluid 60 from flowing therethrough. In non-limiting examples, baffle plate 102 may be formed from metal, metal alloys, ceramics, polymers, and any other material having similar properties and/or characteristics, capable of withstanding the environment of HRSG 54.

In the non-limiting example, baffle plate 102 of baffle assembly 100 may include a first end 104 and a second end 106. First end 104 may be positioned adjacent and substantially downstream of exhaust channel 59 coupled to and/or in communication with casing 66 of HRSG 54. Second end 106 may be positioned axially opposite and substantially downstream of first end 104 of baffle plate 102. Additionally as shown in FIG. 3, baffle plate 102 may include a first surface 108, and a second surface 110. Each of first surface 108 and second surface 110 may extend between first end 104 and second end 106, respectively. In the non-limiting example, first surface 108 may be included within and/or may define desired flow path 78 of exhaust fluid 60 flowing through casing 66 of HRSG 54. As such, first surface 108 of baffle plate 102 may also be substantially exposed to and/or may be contacted by exhaust fluid 60 flowing through casing 66 during operation of power plant system 12 and/or HRSG 54. Second surface 110 may be positioned opposite first surface 108 of baffle plate 102, and as a result, may not be exposed to exhaust fluid 60 flowing through casing 66 of HRSG 54. As shown in FIG. 3, second surface 110 of baffle plate 102 may be positioned adjacent and/or may be exposed to space 80 formed within casing 66.

As shown in FIG. 3, baffle assembly 100 may also include a hinge component 112. Hinge component 112 may be fixed relative to casing 66, and may be positioned within casing 66 of HRSG 54. Specifically, in one example, hinge component 112 may be positioned on and/or fixed relative to removable panel 68 of casing 66. In a non-limiting example shown in FIG. 3, hinge component 112 may positioned on, coupled to, and/or affixed relative to a first internal surface 82 of removable panel 68 of casing 66 for HRSG 54. As shown in FIG. 3, first internal surface 82 may be formed on a portion of removable panel 68 of casing 66 that is positioned adjacent to and downstream from exhaust channel 59 (see, FIG. 2) providing exhaust fluid 60 to casing 66 of HRSG 54. Additionally in the non-limiting example, first internal surface 82 of removable panel 68 of casing 66 may be formed substantially parallel to a flow direction of exhaust fluid 60, represented by the arrow in FIG. 3, flowing through casing 66 of HRSG 54. Hinge component 112 may positioned on, coupled to, and/or affixed relative to a first internal surface 82 using any suitable joining technique, process, and/or components. In non-limiting examples, hinge component 112 may be substantially fixed (e.g., welded, brazed, riveted, and so on) or releasably coupled (e.g., nut-and-bolt, screws, and so on) to first internal surface 82 of removable panel 68 of casing 66. Alternative positions for hinge component 112 within casing 66 will be discussed herein.

Additionally, hinge component 112 may be coupled to first end 104 of baffle plate 102. Specifically, hinge component 112 may be coupled to, may be affixed to, and/or may receive first end 104 of baffle plate 102. Hinge component 112 may be formed as any suitable hinge component or assembly that may be capable of adjusting a rotational position of baffle plate 102 within casing 66 of HRSG 54. That is, hinge component 112 may be formed as any suitable hinge component or assembly, for example a pivot hinge, that may be configured to move, and/or rotate baffle plate 102 substantially about first end 104, in a direction (ROT), to adjust the rotational position of baffle plate 102 in casing 66. As discussed herein, hinge component 112, including baffle plate 102, may be coupled and/or affixed to removable panel 68 of casing 66 prior to installation of removable panel 68 within casing 66, and/or casing 66 in power plant system 12 (see, FIG. 1) to reduce installation and/or assembly time of HRSG 54 before use within power plant system 12.

Baffle assembly 100 may also include an extension plate 118. As shown in FIG. 3, extension plate 118 may be positioned adjacent second end 106 of baffle plate 102, and substantially downstream of hinge component 112 and first end 104 of baffle plate 102, respectively. Extension plate 118 may also be configured to receive, contact and/or support second surface 110 of baffle plate 102. For example, a portion of baffle plate 102 including second end 106 may be positioned above and/or may extend over at least a portion of extension plate 118. As such, second surface 110 of the portion of baffle plate 102 extending over extension plate 118 may be received by, directly contact, and/or rest on extension plate 118 when baffle assembly 100 is included within casing 66 of HRSG 54.

In the non-limiting example shown in FIG. 3, extension plate 118 may also be positioned on, coupled to, and/or affixed relative to tube sheet 76 of HRSG 54, and may extend from tube sheet 76 toward baffle plate 102. Extension plate 118 may be positioned on, coupled to, and/or affixed relative to tube sheet 76 of HRSG 54 and may extend from tube sheet 76 to substantially receive, contact, and/or support baffle plate 102 of baffle assembly 100 within casing 66 of HRSG 54, as discussed herein. Extension plate 118 may be positioned on, coupled to, and/or affixed relative to tube sheet 76 using any suitable joining technique, process, and/or components. In non-limiting examples, extension plate 118 may be substantially fixed (e.g., welded, brazed, riveted, and so on) or releasably coupled (e.g., nut-and-bolt, screws, and so on) to tube sheet 76. In other non-limiting examples (see, FIGS. 11 and 12), extension plate 118 may be positioned on, coupled to, affixed relative to, and/or structurally supported by casing 66 of HRSG 54. Extension plate 118 of baffle assembly 100 may be formed as a substantially rigid component, and/or may be formed from any substantially rigid material that may support the portion of baffle plate 102 contacting extension plate 118, as well as additional components of baffle assembly 100, as discussed herein. In non-limiting examples, extension plate 118 may be formed from metal, metal alloys, ceramics, polymers, and any other material having similar properties and/or characteristics, capable of withstanding the HRSG environment.

Baffle assembly 100 may also include a first diverter plate 120. Briefly turning to FIG. 4, and with continued reference to FIG. 3, first diverter plate 120 of baffle assembly 100 may be positioned adjacent and extend above or over second end 106 of baffle plate 102. First diverter plate 120 may also directly contact first surface 108 of baffle plate 102. That is, first diverter plate 120 may directly contact and/or apply a force to first surface 108 of baffle plate 102 to impinge, hold, and/or press baffle plate 102 against extension plate 118. Additionally, and as discussed herein, first diverter plate 120 may direct exhaust fluid 60 through casing 66 of HRSG 54, and/or may be configured to direct or move exhaust fluid 60 over distinct portions or components (e.g., a support component) of baffle assembly 100 and/or into desired flow path 78. First diverter plate 120 may be formed from any suitable material that may contact and apply a force to first surface 108 of baffle plate 102 to hold or press baffle plate 102 against extension plate 118 during operation of HRSG 54. For example, first diverter plate 120 may be formed from any suitable material that may have substantially ductile, and/or pliable characteristics or properties. In non-limiting examples, first diverter plate 120 may be formed from metal, metal alloys, memory alloys, polymers, and the like.

Figure 4:
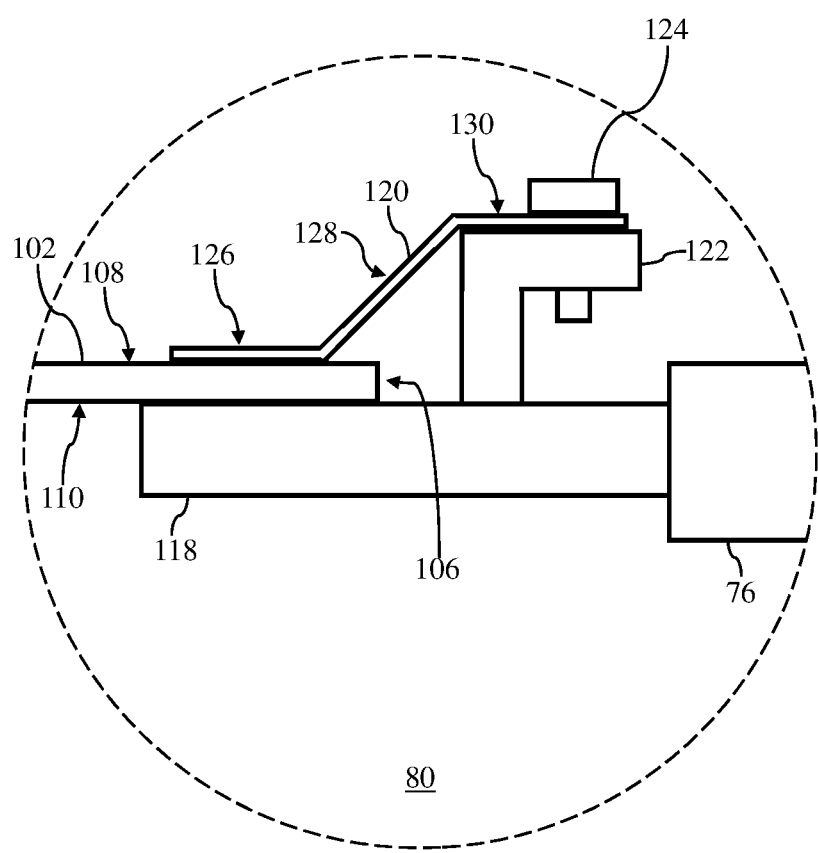
FIG. 4 shows an enlarged view of a portion of the hinged baffle assembly of FIG. 3, according to embodiments of the disclosure.

First diverter plate 120 may be positioned on, coupled to, and/or affixed relative to a first support component 122 of baffle assembly 100. First support component 122 may maintain first diverter plate 120 within casing 66 and/or support first diverter plate 120 as it contacts and/or applies a force to baffle plate 102, as discussed herein. In a non-limiting example shown in FIGS. 3 and 4, first diverter plate 120 may be releasably coupled to first support component 122 of baffle assembly 100 via a fastener 124 positioned between first diverter plate 120 and first support component 122, respectively. Fastener 124 may be any suitable component or assembly that may releasably couple first diverter plate 120 to first support component 122 including, but not limited to, a bolt-and-nut, a snap-fit, a screw, clevis-and-cotter pins, and the like. In other non-limiting examples, first diverter plate 120 may be affixed to first support component 122 of baffle assembly 100 using any suitable component or process including, but not limited to, riveting, melting, brazing, welding, and so on. As shown in FIGS. 3 and 4, first support component 122 of baffle assembly 100 may be positioned on and/or extend from extension plate 118, adjacent and downstream from second end 106 of baffle plate 102. First support component 122 may be positioned on extension plate 118 and adjacent second end 106 of baffle plate 102 to position first diverter plate 120 partially over baffle plate 102 and/or allow first diverter plate 120 to contact baffle plate 102, as discussed herein. For example, first diverter plate 120 coupled to first support component 122 may extend from first support component 122 toward and/or over second end 106 of baffle plate 102, such that first diverter plate 120 may directly contact and apply a force to first surface 108 of baffle plate 102 to hold or press baffle plate 102 against extension plate 118 during operation of HRSG 54.

In the non-limiting example shown in FIGS. 3 and 4, first diverter plate 120 may include a base section 126. Base section 126 of first diverter plate 120 may directly contact first surface 108 of baffle plate 102. Additionally, and as shown in FIGS. 3 and 4, base section 126 of first diverter plate 120 may be substantially planar and/or parallel to first surface 108 of baffle plate 102 to ensure and/or optimize contact between base section 126 of first diverter plate 120 and first surface 108 of baffle plate 102. In the non-limiting example, first diverter plate 120 may also include an angled section 128. Angled section 128 may be positioned adjacent to base section 126, and may extend (angularly) between base section 126 and a coupling section 130 of first diverter plate 120. Additionally, angled section 128 may be angled, non-planar, and/or not parallel with first surface 108 of baffle plate 102. Angled section 128 may be substantially angled and/or extend angularly between base section 126 and coupling section 130 to divert and/or direct exhaust fluid 60 flowing over baffle plate 102 toward fluid tube(s) 70 and/or over distinct portions or components of baffle assembly 100. For example, angled section 128 may direct exhaust fluid over a first support component 122 of baffle assembly 100 receiving first diverter plate 120, as discussed herein. Additionally in the non-limiting example shown in FIGS. 3 and 4, coupling section 130 of first diverter plate 120 may be positioned adjacent angled section 128 and opposite base section 126. Coupling section 130 of first diverter plate 120 may extend toward, may be received by, and/or may be coupled to first support component 122 of baffle assembly 100. Fastener 124 may contact and/or pass through coupling section 130 to (releasably) couple first diverter plate 120 to first support component 122, as discussed herein.

As shown in FIG. 3, baffle assembly 100 may also include a sealing plate 132 positioned on, e.g., first internal surface 82 of casing 66 for HRSG 54. Sealing plate 132 may be positioned on, coupled to, and/or affixed relative to first internal surface 82 adjacent to and downstream of hinge component 112, and may also be positioned adjacent first end 104 of baffle plate 102. As a result of being positioned on, coupled to, and/or affixed relative to first internal surface 82 of casing 66, sealing plate 132 may be positioned below baffle plate 102. Specifically, sealing plate 132 positioned adjacent hinge component 112 may be positioned below and may substantially contact, press, and/or form a seal against second surface 110 of baffle plate 102. Sealing plate 132 may contact second surface 110 of baffle plate 102 to form a seal for baffle assembly 100, which in turn may substantially prevent exhaust fluid 60 from flowing between hinge component 112 and baffle plate 102, and substantially prevent exhaust fluid 60 from leaking below baffle plate 102 into space 80. Sealing plate 132 may be formed from any suitable material that may form a seal with baffle plate 102 and may prevent exhaust fluid 60 from leaking into space 80. For example, sealing plate 132 may be formed from any suitable material that may have substantially elastic, ductile, flexible, and/or pliable characteristics or properties. In non-limiting examples, sealing plate 132 may be formed from metal, metal alloys, memory alloys, polymers, foam, and the like.

To add rigidity and/or weight to baffle plate 102, baffle assembly 100 may include a stiffener 134. In the non-limiting example shown in FIG. 3, stiffener 134 may be positioned on, coupled to, and/or affixed to second surface 110 of baffle plate 102, and may extend into space 80 of casing 66. In other non-limiting examples discussed herein (see, FIG. 9), stiffener 134 may be positioned on, coupled to, and/or affixed to first surface 108 of baffle plate 102. Stiffener 134 may be positioned between first end 104 and second end 106 of baffle plate 102, respectively. Additionally, stiffener 134 may be spaced apart or separated from casing 66 and extension plate 118 by a gap to avoid any obstruction when rotating baffle plate 102 in a direction (ROT), as discussed herein. Stiffener 134 may be formed from any suitable material that may provide or add rigidity and/or weight to baffle plate 102. In non-limiting examples, stiffener 134 may be formed from metal, metal alloys, polymers, ceramic, and the like. As discussed herein, during operation baffle plate 102 may be exposed to high temperature exhaust fluid 60, which in turn may expand, grow, and/or deform baffle plate 102, based on baffle plate's 102 material composition and/or properties. Stiffener 134 may aid baffle plate 102 in preventing leakage of exhaust fluid 60 by providing rigidity to prevent/reduce grow or deformation of baffle plate 102, and/or adding weight to ensure baffle plate 102 maintains contact with respective components of baffle assembly 100 (e.g., sealing plate 132, extension plate 118, and so on), as discussed herein.

Figure 5:
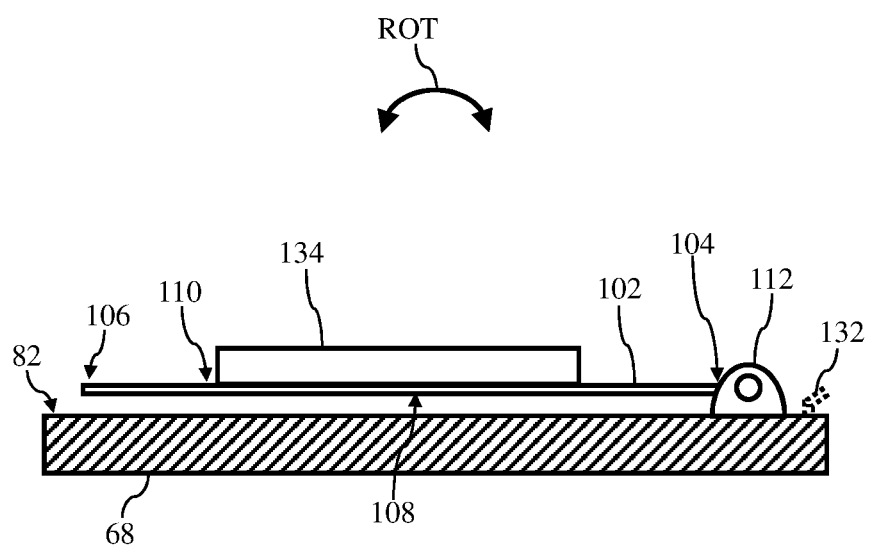
FIG. 5 shows a side view of a hinge component and baffle plate of the hinged baffle assembly shown in FIG. 3 positioned on a removable panel of a casing for the HRSG of FIG. 1, according to embodiments of the disclosure.
Figure 6:
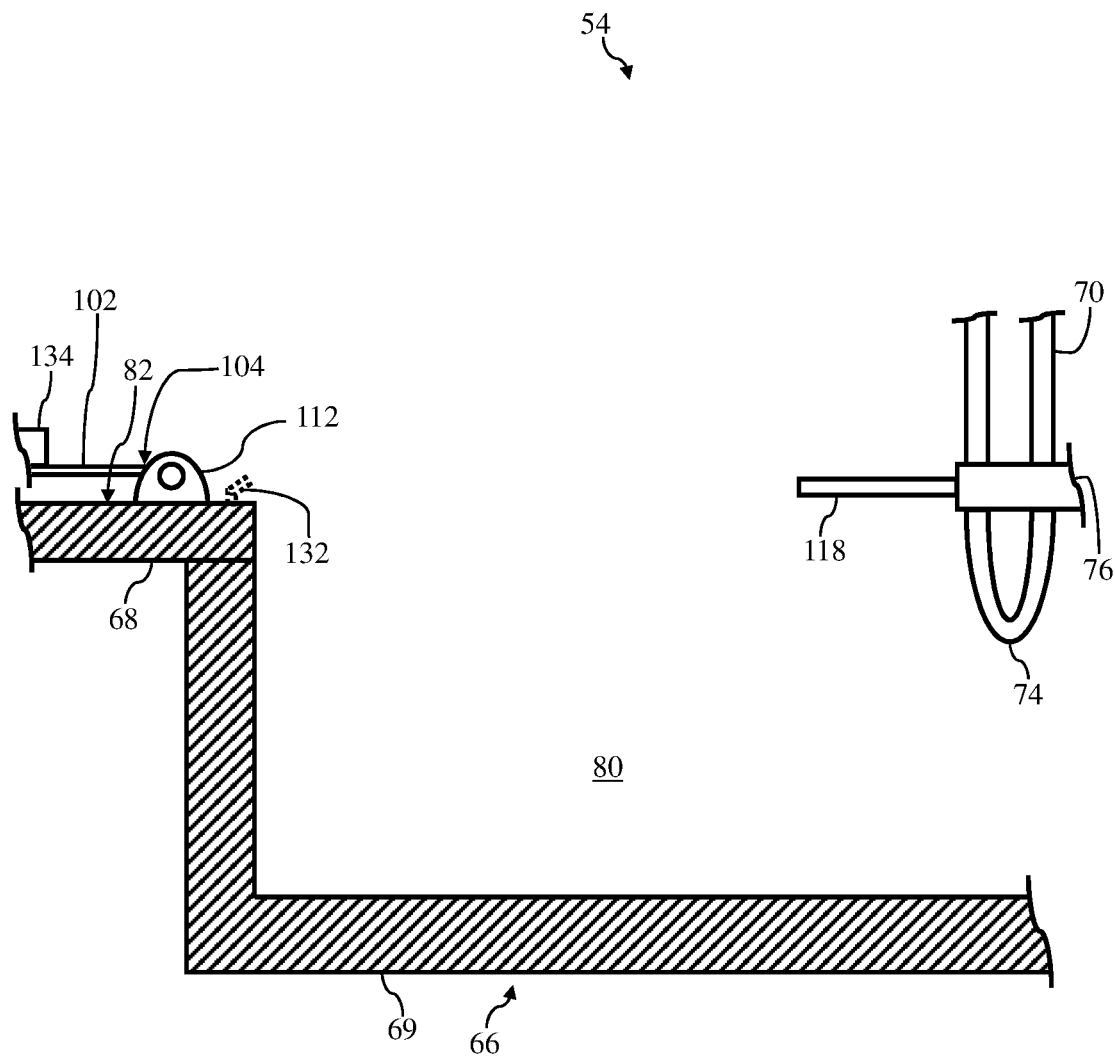
FIGS. 6-8 show side cross-sectional views of the hinged baffle assembly of FIG. 3 undergoing an installation process within the HRSG of FIG. 1, according to embodiments of the disclosure. The hinged baffle assembly includes the removable panel, hinge component, and baffle plate shown in FIG. 5.
Figure 7:
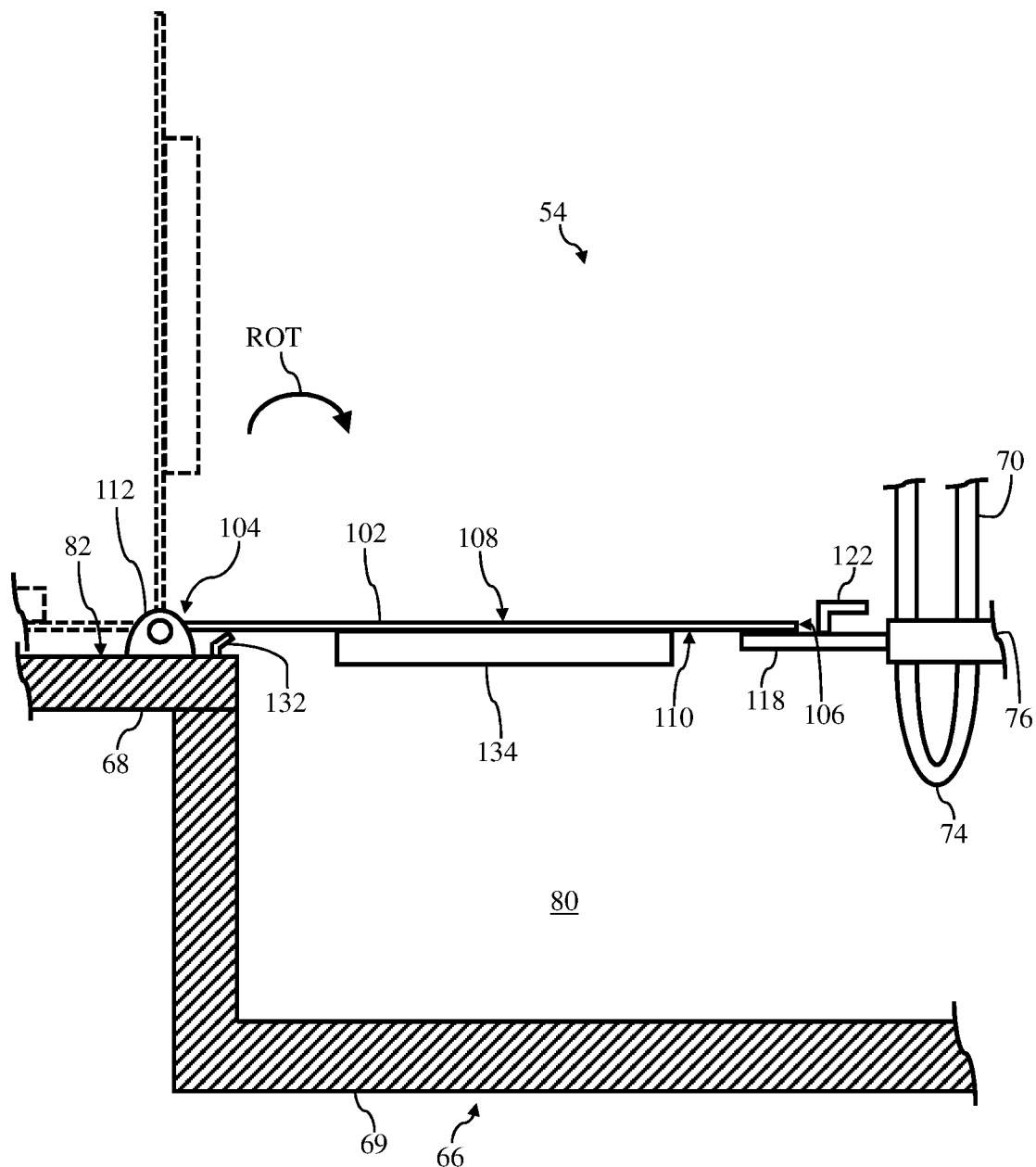
Figure 8:
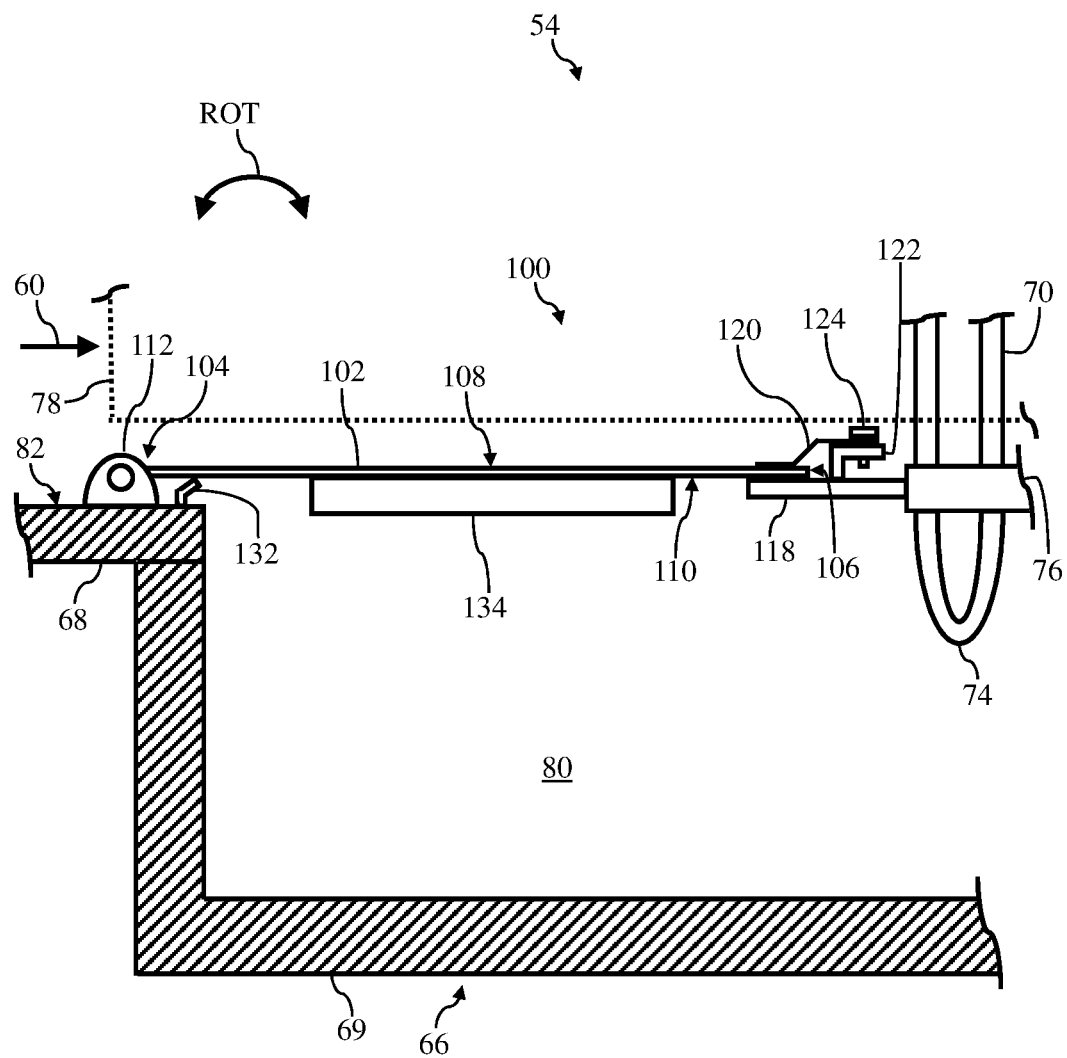

FIGS. 5-8 show side cross-sectional views of the hinged baffle assembly 100 of FIG. 3 undergoing an installation process within casing 66 of HRSG 54 (see, FIG. 3). Specifically, FIG. 5 shows a side cross-sectional view of removable panel 68 including hinge component 112 and baffle plate 102 installed therein, and FIGS. 6-8 show side cross-sectional view baffle assembly 100 undergoing an installation process within casing 66 of HRSG 54. In addition to directing exhaust fluid 60 through casing 66 and/or defining desired flow path 78 in casing 66, and as discussed herein, the use or incorporation of baffle assembly 100 within casing 66 of HRSG 54 may reduce and/or improve installation time and/or accuracy. It is understood that similarly numbered and/or named components may function in a substantially similar fashion. Redundant explanation of these components has been omitted for clarity.

As discussed herein, removable panel 68 may be a distinct component or part that may be coupled to remaining portion 69 to collectively form casing 66. In the non-limiting example shown in FIG. 5, removable panel 68 is shown in a "pre-installation state" and may not yet be coupled to remaining portion 69 of casing 66. In the pre-installation state, removable panel 68 may be positioned outside of and/or off-site from power plant system 12 (see, FIG. 1), for example, at a manufacturing site or factory that may ship removable panel to the site or location of power plant system 12 for installation, as discussed herein. Additionally in the pre-installation state, removable panel 68 may include a portion of the components forming baffle assembly 100 installed or included thereon. For example, hinge component 112 of baffle system 100 may positioned on, coupled to, and/or affixed relative to a first internal surface 82 of removable panel 68, and first end 104 of baffle plate 102 may be coupled to, may be affixed to, and/or may be received hinge component 112. Additionally, sealing plate 132 (shown in phantom as optional) may also be positioned on, coupled to, and/or affixed relative to first internal surface 82 of removable panel 68 adjacent to hinge component 112 in the pre-installation state of removable panel 68. In the pre-installation state, hinge component 112 may allow baffle plate 102 to be rotated and/or positioned directly above removable panel 68; distinct and/or opposition from a desired or operational position (compare, FIG. 5 with FIG. 3 or 8). Baffle plate 102 may be positioned directly above removable panel 68 to reduce the size of the pre-installation assembly of removable panel 68, baffle plate 102, hinge component 112, and sealing plate 132, and aid and/or protect the components when shipped or transported to the location or site of HRSG 54 and/or power plant system 12.

Portions of baffle assembly 100 (e.g., hinge component 112, baffle plate 102, and so on) may be installed on removable panel 68 in the pre-installation state to reduce and/or improve installation time and/or accuracy for baffle system 100 within HRSG 54. For example, by installing and/or positioning hinge component 112 and baffle plate 102, the largest component of baffle assembly 100, on removable panel 68 prior to coupling removable panel 68 to remaining portion 69 of casing 66, an operator and/or user may have more room and/or space for positioning hinge component 112 and baffle plate 102 on removable panel 68. Additionally, the operator and/or user may have a greater ability to manipulate the position and/or move removable panel 68 when installing and/or positioning hinge component 112 and baffle plate 102 on removable panel 68. As such, installation and/or positioning of hinge component 112 and baffle plate 102 on removable panel 68 may be performed more easily and/or more accurately than an in-situ installation (e.g., in casing 66 of HRSG 54).

Additionally, positioning hinge component 112 and baffle plate 102 on removable panel 68 prior to coupling removable panel 68 to remaining portion 69 of casing 66, may reduce and/or improve installation time and/or accuracy for baffle system 100 within HRSG 54 as a result of baffle plate's 102 ability to rotated in a direction (ROT) about hinge component 112. That is, because hinge component 112 and baffle plate 102 are positioned on removable panel 68 in the pre-installation state, once removable panel 68 is coupled to remaining portion 69 to form casing 66, baffle plate 102 may simply be rotated in the direction (ROT) and placed in a desired and/or operational position within HRSG 54 in a matter of seconds. With reference to FIGS. 6-8, an installation process of baffle assembly 100 may be discussed herein. As shown in FIG. 6, removable panel 68 may be coupled to and/or affixed to remaining portion 69 to form casing 66 of HRSG 54. In the non-limiting example, and similar to the pre-installation state discussed herein with respect to FIG. 5, baffle plate 102 may be rotated and/or positioned above removable panel 68 when performing the coupling or joining process between removable panel 68 and remaining portion 69. Additionally, baffle plate 102 may be positioned above removable panel 68 to allow an operator or user of power plant system 12 to more easily install, position, couple, and/or affix extension plate 118 relative to tube sheet 76 of HRSG 54. That is, by rotating and/or positioning baffle plate 102 above removable panel 68, the space between removable panel 68 and tube sheet 76 may be substantially unobstructed or open, and the operator or user may have access to tube sheet 76 for installing extension plate 118 thereon. In another non-limiting example, extension plate 118 may be pre-installed on tube sheet 76, such that when tube sheet 76 is fixed within casing 66 of HRSG 54, extension plate 118 may already be positioned, coupled, and/or affixed to tube sheet 76, as discussed herein. To further reduce installation time, removable panel 68 may also be installed and/or coupled to remaining portion 69 at the same time that extension plate 118 is installed or coupled to tube sheet 76.

Turning to FIG. 7, once removable panel 68 is installed and/or coupled to remaining portion 69 to form casing 66, and extension plate 118 is installed or coupled to tube sheet 76, baffle plate 102 may be rotated in the direction (ROT) to the desired and/or operational position. That is, and as shown in FIG. 7 in various stages using phantom lines, baffle plate 102 may be rotated in the direction (ROT) from the pre-installation state position above first internal surface 82 of removable panel 68 (baffle 102 shown in phantom) to the desired and/or operational position. In the desired and/or operational position, second surface 110 of baffle plate 102 may be received by, directly contact, and/or rest on extension plate 118, as discussed herein. If not positioned on removable panel 68 in the pre-installation state (see, FIG. 5), sealing plate 132 may be positioned on removable panel 68 before rotating baffle plate 102. Additionally, and as shown in FIG. 7, first support component 122 of baffle assembly 100 may also be positioned on and/or extend from extension plate 118, adjacent and downstream from second end 106 of baffle plate 102 after installing and/or coupling removable panel 68 to remaining portion 69. In another non-limiting example, and similar to extension plate 118, first support component 122 may be pre-installed on extension plate 118, such that when extension plate 118 is coupled and/or affixed to tube sheet 76 of HRSG 54, first support component 122 may already be positioned, coupled, and/or affixed to extension plate 118.

Once baffle plate 102 is rotated in the direction (ROT) and positioned in the desired and/or operational position, and first support component 122 is coupled to extension plate 118, first diverter plate 120 may be installed within HRSG 54. As discussed herein, and as shown in FIG. 8, first diverter plate 120 may be coupled to and/or received by first support component 122, via fastener 124, and may extend over second end 106 of baffle plate 102. Additionally when installed within HRSG 54, first diverter plate 120 may directly contact and/or apply a force to first surface 108 of baffle plate 102 to impinge, hold, and/or press baffle plate 102 against extension plate 118. By positioning and/or installing baffle plate 102 and hinge component 112 on removable panel 68 in the pre-installation state (see, FIG. 5), providing operators or users more space or access within casing 66 to installation additional components of baffle assembly 100 (e.g., extension plate 118; FIG. 6), and/or preinstalling components of baffle assembly 100 to distinct components of baffle assembly 100 and/or HRSG 54, installation of baffle assembly 100 within HRSG 54 may be achieved more quickly and/or more accurately when compared to conventional installation processes.

Figure 9:
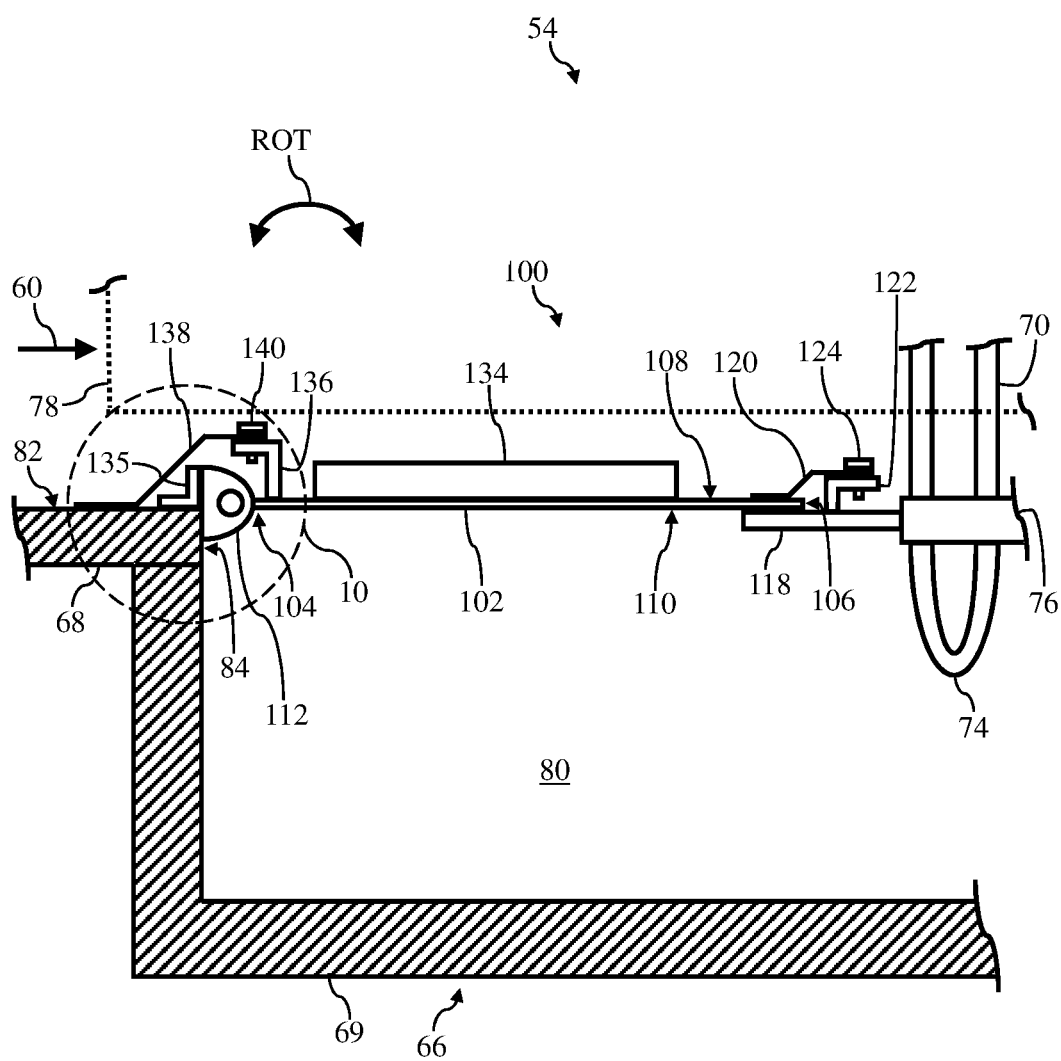
FIG. 9 shows a side cross-sectional view of a portion of an HRSG of the combined cycle power plant system of FIG. 1 and a hinged baffle assembly, according to additional embodiments of the disclosure.
Figure 10:
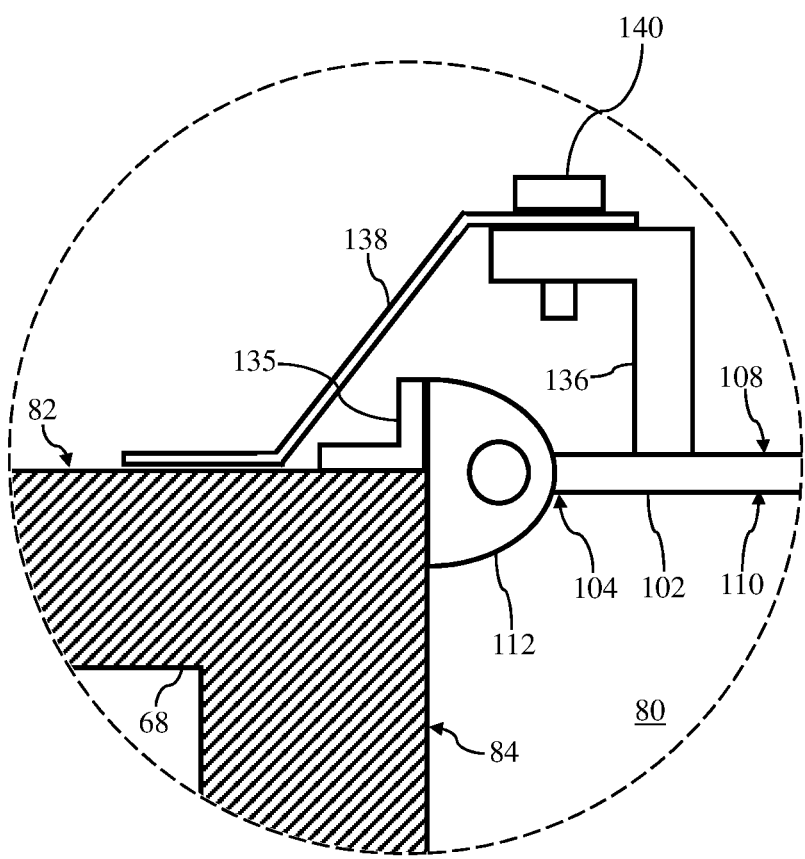
FIG. 10 shows an enlarged view of a portion of the hinged baffle assembly of FIG. 9, according to embodiments of the disclosure.

FIGS. 9 and 10 show views of another non-limiting example of baffle assembly 100. Specifically, FIG. 9 shows a side cross-sectional view of a bottom portion of casing 66 of HRSG 54, fluid tube(s) 70, tube sheet 76, and another non-limiting example of baffle assembly 100, and FIG. 10 shows an enlarged view of a portion of baffle assembly 100 of FIG. 9. It is understood that similarly numbered and/or named components may function in a substantially similar fashion. Redundant explanation of these components has been omitted for clarity.

In the non-limiting examples shown in FIGS. 9 and 10, and distinct from the example shown and discussed herein with respect to FIGS. 3 and 4, hinge component 112 of baffle assembly 100 may be positioned on a distinct portion of removable panel 68 of casing 66. For example, hinge component 112 may be positioned on, coupled to, and/or affixed relative to a second internal surface 84 of removable panel 68 of casing 66 for HRSG 54. Second internal surface 84 may be distinct from and/or positioned adjacent to first internal surface 82. That is, and as shown in FIG. 9, second internal surface 84 may be formed on a portion of removable panel 68 of casing 66 that is positioned adjacent to and downstream from first internal surface 82. Second internal surface 84 may be formed substantially perpendicular to a flow direction of exhaust fluid 60, represented by the arrow in FIG. 9, flowing through casing 66 of HRSG 54, and/or first internal surface 82. Hinge component 112 may be positioned on, coupled to, and/or affixed relative to second internal surface 84 of removable panel 68 of casing 66, and adjacent first internal surface 82, using any suitable joining technique, process, and/or components, as discussed herein.

In the non-limiting examples shown in FIGS. 9 and 10, hinge component 112 may also be coupled to a support bracket 135 of baffle assembly 100. That is, in order to position baffle plate 102 within casing 66 to direct exhaust fluid 60 through casing 66 and/or define desired flow path 78 for exhaust fluid 60, hinge component 112 may be coupled on second internal surface 84 substantially adjacent to first internal surface 82. Additionally, and as shown in FIGS. 9 and 10, a portion of hinge component 112 may even extend above second internal surface 84 of removable panel 68 of casing 66. In order to provide additional support and/or to ensure hinge component 112 is stable within casing 66, hinge component 112 of baffle assembly 100 may also be coupled to support bracket 135 positioned on, coupled to, and/or affixed relative to first internal surface 82 of removable panel 68 of casing 66 for HRSG 54. Support bracket 135 may be any suitable bracket and/or component (e.g., L-bracket) that may be configured to support and/or secure hinge component 112 within casing 66 of HRSG 54.

Additionally in the non-limiting examples shown in FIGS. 9 and 10, and distinct from the example shown and discussed herein with respect to FIGS. 3 and 4, baffle assembly 100 may also include a second support component 136 and a second diverter plate 138. Second support component 136 may be distinct from first support component 122, and second diverter plate 138 may be distinct from first diverter plate 120. As shown in FIGS. 9 and 10, second support component 136 may be formed on baffle plate 102 and may receive and/or be coupled to second diverter plate 138. Specifically, second support component 136 may be formed on and/or may extend from first surface 108 of baffle plate 102, adjacent from and downstream of first end 104 of baffle plate 102. Second diverter plate 138 may be received by, positioned on, coupled to, and/or affixed relative to a second support component 136 of baffle assembly 100 (e.g., fastener 140). Second diverter plate 138 may extend from second support component 136, and may positioned adjacent and extend above or over first end 104 of baffle plate 102. Additionally, second diverter plate 138 may extend above and/or be positioned over hinge component 112 coupled to second internal surface 84, and support bracket 135 coupled to first internal surface 82. Second diverter plate 138 may also extend above and/or may directly contact first internal surface 82 of casing 66 for HRSG 54. As similarly discussed herein with respect to first diverter plate 120, second diverter plate 138 may be formed within casing 66 to direct or move exhaust fluid 60 over distinct portions or components (e.g., hinge component 112, support bracket 135) of baffle assembly 100. Additionally, second diverter plate 138 may directly contact first internal surface 82 to form a seal for baffle assembly 100, which in turn may substantially prevent exhaust fluid 60 from flowing underneath second diverter plate 138, between hinge component 112 and baffle plate 102, and to space 80.

Additionally as shown in FIG. 9, stiffener 134 may be positioned on, coupled, and/or affixed to first surface 108 of baffle plate 102 to add rigidity and/or weight to baffle plate 102, as discussed herein. In the non-limiting example, stiffener 134 positioned on, coupled, and/or affixed to first surface 108 of baffle plate 102 may be exposed to exhaust fluid 60 and/or may be positioned within desired flow path 78 for exhaust fluid 60 flowing through casing 66 of HRSG 54. As similarly discussed herein, stiffener 134 may be positioned between first end 104 and second end 106 of baffle plate 102, and may be spaced apart or separated from casing 66 and extension plate 118 by a gap to avoid any obstruction when rotating baffle plate 102 in a direction (ROT).

Figure 11:
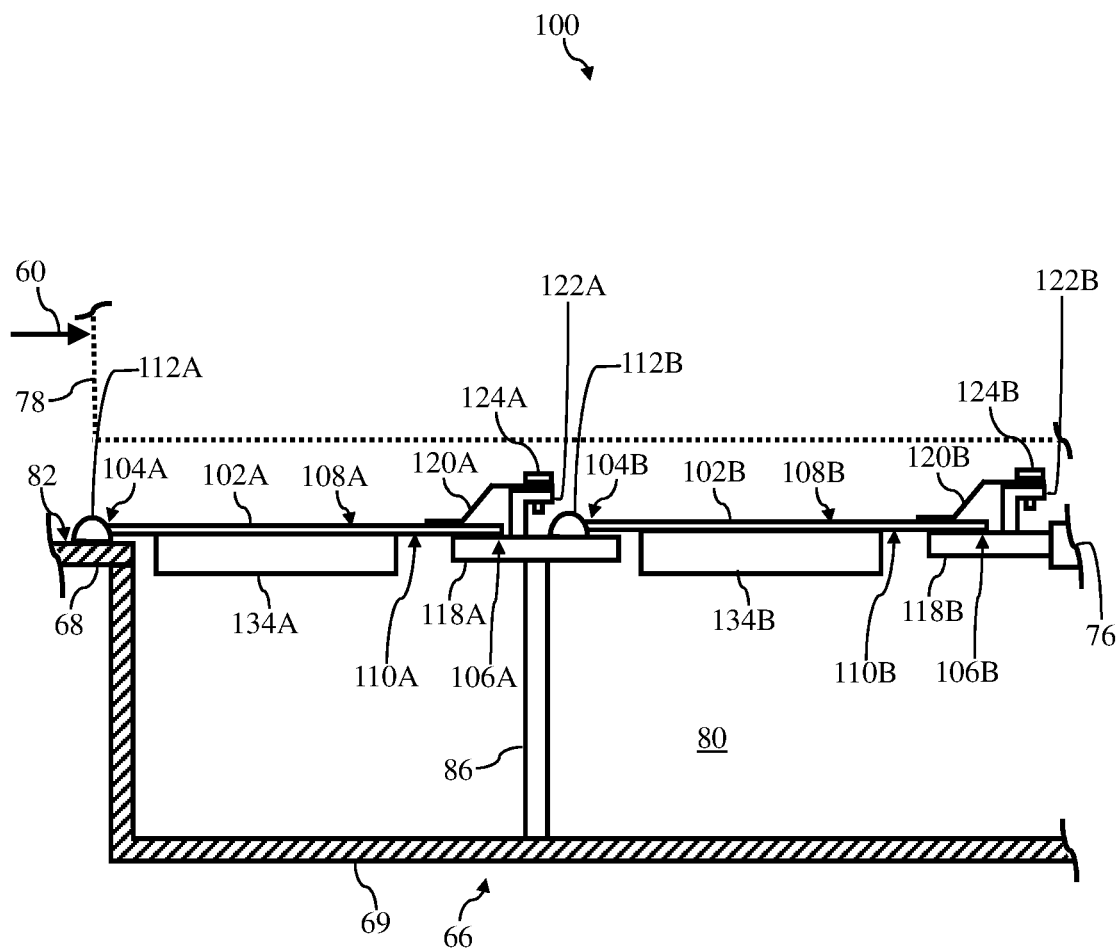
FIG. 11 shows a side view of a plurality of hinged baffle assemblies for an HRSG of a combined cycle power plant system of FIG. 1, according to embodiments of the disclosure.
Figure 12:
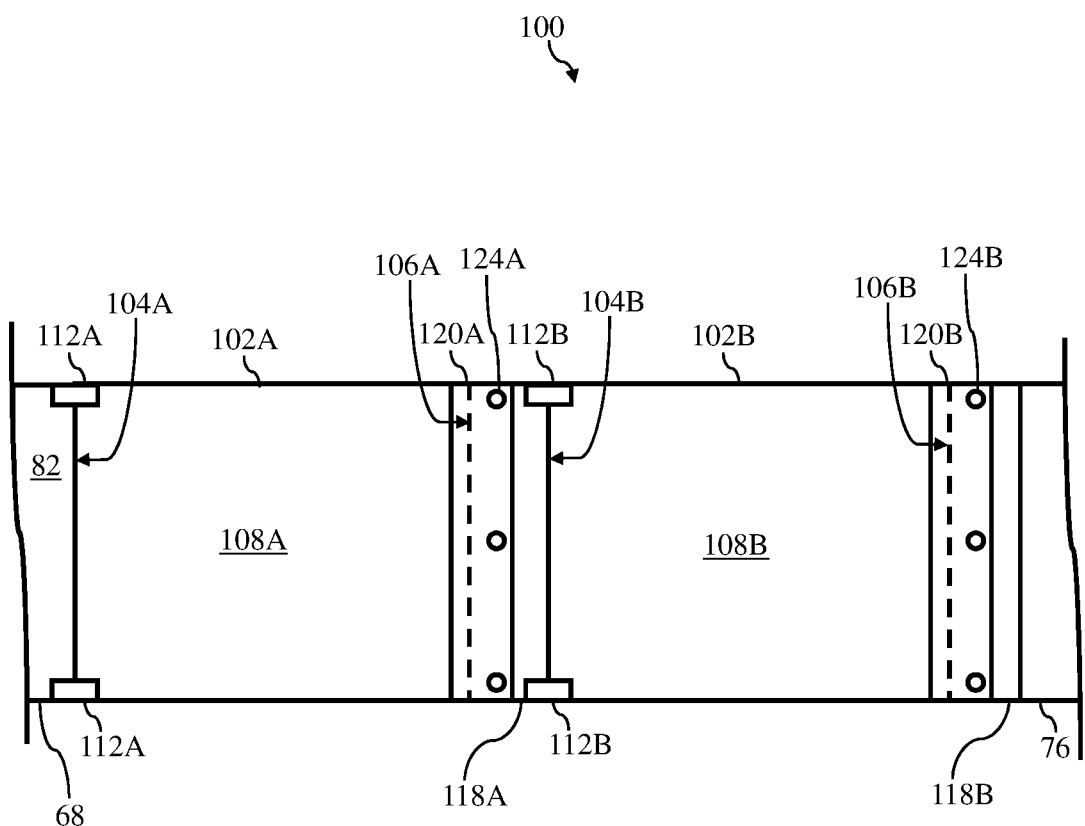
FIG. 12 shows a top view of the plurality of hinged baffle assemblies of FIG. 11, according to embodiments of the disclosure.

FIGS. 11 and 12 show non-limiting examples of a baffle assembly 100 utilized within casing 66 of HRSG 54. Specifically, FIG. 11 shows a side cross-sectional view of a bottom portion of casing 66 of HRSG 54 and baffle assembly 100, and FIG. 12 shows a top view of the baffle assembly 100 of FIG. 11. First baffle plate 102A, first hinge component 112A, first diverter plate 120A, first support component 122A, and first stiffener 134A may be substantially similar to and/or may function in a substantially similar fashion as baffle plate 102, hinge component 112, diverter plate 120, support component 122, and stiffener 134 discussed herein with respect to FIGS. 3 and 4. Redundant explanation of these components has been omitted for clarity. Additionally, sealing plates (see, sealing plate 132; FIG. 3) have been omitted from baffle assembly 100 for clarity, however, it is understood that first sealing plate may be positioned on first internal surface 82 of casing 66, and a second sealing plate may be positioned on first extension plate 118A, in a similar fashion as discussed herein with respect to FIG. 3.

As shown in FIGS. 11 and 12, and distinct from the non-limiting examples discussed herein with respect to FIGS. 2-5, first extension plate 118A of baffle assembly 100 may not be coupled and/or affixed to tube sheet 76. Rather, first extension plate 118A may be positioned on, coupled to, affixed relative to, and/or structurally supported by casing 66 of HRSG 54. For example, and as shown in FIG. 11, a brace 86 may extend from casing 66 to support, hold and/or secure first extension plate 118A within casing 66 of HRSG 54. In another non-limiting example (not shown), first extension plate 118A may be positioned on, coupled to, affixed relative to, and/or extend from a sidewall of casing 66 for HRSG 54.

Additionally as shown in FIGS. 11 and 12, baffle assembly 100 may also include second baffle plate 102B, second hinge component 112B, second extension plate 118B, second diverter plate 120B, second support component 122B, and second stiffener 132B. Second baffle plate 102B, second hinge component 112B, second extension plate 118B, second diverter plate 120B, second support component 122B, and second stiffener 132B may function substantially similar to similarly named or numbered components discussed herein. However in the non-limiting example shown in FIGS. 11 and 12, second baffle plate 102B, second hinge component 112B, second extension plate 118B, second diverter plate 120B, second support component 122B, and second stiffener 132B may be positioned in distinct portions and/or on distinct components of baffle assembly 100 and/or casing 66 of HRSG 54.

For example, second baffle plate 102B may extend between first extension plate 118A and second extension plate 118B. Additionally second baffle plate 102B may include a first end 104B positioned adjacent second end 106A of first baffle plate 102A, first extension plate 118A, and/or first support component 122A. Second hinge component 112B of baffle assembly 100 may be coupled to first end 104B of second baffle plate 102B, and may be positioned on, coupled to, and/or affixed relative to first extension plate 118A, adjacent and downstream from second end 106A of first baffle plate 102A, and/or first support component 122A. Second extension plate 118B may be positioned adjacent and may receive/contact second end 106B of second baffle plate 102B. Additionally, second extension plate 118B may be positioned on, coupled to, and/or affixed relative to tube sheet 76 of HRSG 54, and may extend from tube sheet 76 toward second baffle plate 102B. Second diverter plate 120B may be positioned adjacent second end 106B of second baffle plate 102B. Additionally, second diverter plate 120B may directly contact and/or apply a force to first surface 108B of second baffle plate 102B to impinge, hold, and/or press second baffle plate 102B against second extension plate 118B. Second support component 122B may be positioned on second extension plate 118B, adjacent second end 106B of second baffle plate 102B, and may receive second diverter plate 120B.

Technical effect is to provide hinged baffle assemblies for heat recovery steam generators (HRSGs) of a combined cycle power plant system that reduce and/or improve installation time and/or accuracy, are capable of improving the flow of an exhaust fluid to within the HRSG, and minimize or prevent leakage of the exhaust fluid from the desired flow path of the HRSG.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A baffle assembly for a heat recover steam generator (HRSG), the baffle assembly comprising:
    a baffle plate directing an exhaust fluid through a casing of the HRSG, the baffle plate including:
        a first end of the baffle plate;
        a second end of the baffle plate positioned opposite the first end of the baffle plate;
        a first surface of the baffle plate extending between the first end and the second end, the first surface exposed to the exhaust fluid flowing through the casing of the HRSG; and
        a second surface of the baffle plate extending between the first end and the second end, the second surface positioned opposite the first surface;
    a hinge component coupled to the first end of the baffle plate to adjust a rotational position of the baffle plate within the HRSG, the hinge component positioned within and fixed relative to the casing of the HRSG; and
    a first diverter plate positioned adjacent to the second end of the baffle plate, the first diverter plate directly contacting the first surface of the baffle plate and directing the exhaust fluid through the casing of the HRSG.

2. The baffle assembly of claim 1, further comprising:
    a stiffener affixed to one of the first surface of the baffle plate or the second surface of the baffle plate, the stiffener positioned between the first end and the second end of the baffle plate.

3. The baffle assembly of claim 1, further comprising:
    an extension plate positioned adjacent the second end of the baffle plate, the extension plate receiving and contacting the second surface of the baffle plate; and
    a first support component positioned on the extension plate, adjacent the second end of the baffle plate, the first support component receiving the first diverter plate.

4. The baffle assembly of claim 3, wherein the first diverter plate is coupled to the first support component and extends from the first support component to the second end of the baffle plate.

5. The baffle assembly of claim 3, wherein the hinge component is coupled to one of:
    a first internal surface of the casing of the HRSG, the first internal surface of the casing formed substantially parallel to a flow direction of the exhaust fluid flowing through the HRSG; or
    a second internal surface of the casing of the HRSG, distinct from the first internal surface, the second internal surface of the casing formed substantially perpendicular to the flow direction of the exhaust fluid flowing through the HRSG.

6. The baffle assembly of claim 5, further comprising:
    a sealing plate positioned on the first internal surface of the casing of the HRSG, adjacent the hinge component, the sealing plate positioned below and contacting the second surface of the baffle plate.

7. The baffle assembly of claim 5, further comprising:
    a second support component formed on the first surface of the baffle plate, adjacent the first end; and
    a second diverter plate coupled to the second support component, the second diverter plate substantially covering the hinge component positioned on the second internal surface of the casing of the HRSG, and contacting the first internal surface of the casing of the HRSG.

8. A heat recover steam generator (HRSG) comprising:
a casing for receiving an exhaust fluid;
at least one fluid tube positioned within the casing; and
a baffle assembly positioned within the casing, adjacent the at least one fluid tube, the baffle assembly including:
a baffle plate directing the exhaust fluid through the casing, the baffle plate including:
a first end of the baffle plate;
a second end of the baffle plate positioned opposite the first end of the baffle plate;
a first surface of the baffle plate extending between the first end and the second end the first surface exposed to the exhaust fluid flowing through the casing; and
a second surface of the baffle plate extending between the first end and the second end surface positioned opposite the first surface;
a hinge component coupled to the first end of the baffle plate to adjust a rotational position of the baffle plate within the casing, the hinge component positioned within and fixed relative to the casing; and
a first diverter plate positioned adjacent to the second end of the baffle plate, the first diverter plate directly contacting the first surface of the baffle plate and directing the exhaust fluid to the at least one fluid tube positioned within the casing.

9. The HRSG of claim 8, wherein the baffle assembly further comprises:
an extension plate positioned adjacent the second end of the baffle plate, the extension plate receiving and contacting the second surface of the baffle plate; and
a first support component positioned on the extension plate, adjacent the second end of the baffle plate, the first support component receiving the first diverter plate.

10. The HRSG of claim 9, further comprising a tube sheet coupled to and structurally supporting the at least one fluid tube within the casing, wherein the extension plate is affixed to and extends from the tube sheet.

11. The HRSG of claim 9, wherein the first diverter plate of the baffle assembly is coupled to the first support component and extends from the first support component to the second end of the baffle plate.

12. The HRSG of claim 9, wherein the hinge component of the baffle assembly is coupled to an internal surface of the casing, the internal surface of the casing formed substantially perpendicular to a flow direction of the exhaust fluid flowing through the casing.

13. The HRSG of claim 12, further comprising:
a second support component formed on the first surface of the baffle plate, adjacent the first end; and
a second diverter plate coupled to the second support component, the second diverter plate substantially covering the hinge component.

14. The HRSG of claim 12, wherein the baffle assembly further comprises:
a stiffener affixed to the first surface of the baffle plate, the stiffener positioned between the first end and the second end of the baffle plate.

15. The HRSG of claim 8, wherein the hinge component of the baffle assembly is coupled to an internal surface of the casing, the internal surface of the casing formed substantially parallel to a flow direction of the exhaust fluid flowing through the casing.

16. The HRSG of claim 15, wherein the baffle assembly further comprises:
a sealing plate positioned on the internal surface of the casing, adjacent the hinge component, the sealing plate positioned below and contacting the second surface of the baffle plate.

17. The HRSG of claim 12, wherein the baffle assembly further comprises:
a stiffener affixed to the second surface of the baffle plate, the stiffener positioned between the first end and the second end of the baffle plate.

18. A baffle assembly for a heat recover steam generator (HRSG), the baffle assembly comprising:
a first baffle plate directing an exhaust fluid through a casing of the HRSG, the first baffle plate including a first end and a second end;
a first hinge component coupled to the first end of the first baffle plate to adjust a rotational position of the first baffle plate within the casing of the HRSG, the first hinge component positioned within and fixed relative to the casing of the HRSG;
a first extension plate positioned adjacent the second end of the first baffle plate, the first extension plate receiving and contacting the second end of the first baffle plate;
a first diverter plate positioned adjacent to the second end of the first baffle plate, the first diverter plate directly contacting the first baffle plate and directing the exhaust fluid through the casing of the HRSG;
a second baffle plate directing the exhaust fluid through the casing of the HRSG, the second baffle plate including a first end and second end, the first end of the second baffle plate positioned adjacent the second end of the first baffle plate, the second baffle plate including a second end;
a second hinge component coupled to the first end of the second baffle plate to adjust a rotational position of the second baffle plate within the casing of the HRSG, the second hinge component positioned on the first extension plate;
a second extension plate positioned adjacent the second end of the second baffle plate, the second extension plate receiving and contacting the second end of the second baffle plate; and
a second diverter plate positioned adjacent to the second end of the second baffle plate, the second diverter plate directly contacting the second baffle plate and directing the exhaust fluid through the casing of the HRSG.

19. The baffle assembly of claim 18, further comprising:
a first stiffener affixed to the first baffle plate, the first stiffener positioned between the first end and the second end of the first baffle plate; and
a second stiffener affixed to the second baffle plate, the second stiffener positioned between the first end and the second end of the second baffle plate.

20. The baffle assembly of claim 18, further comprising:
a first support component positioned on the first extension plate, adjacent the second end of the first baffle plate, the first support component receiving the first diverter plate; and
a second support component positioned on the second extension plate, adjacent the second end of the second baffle plate, the second support component receiving the second diverter plate.

* * * * *